(12) United States Patent
Embach

(10) Patent No.: US 7,188,896 B2
(45) Date of Patent: Mar. 13, 2007

(54) HEADPHONE STRUCTURE AND STORAGE THEREFOR

(75) Inventor: James T. Embach, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/008,302

(22) Filed: Dec. 9, 2004

(65) Prior Publication Data

US 2006/0001307 A1 Jan. 5, 2006

Related U.S. Application Data

(60) Provisional application No. 60/584,007, filed on Jun. 30, 2004.

(51) Int. Cl.
*A47C 7/62* (2006.01)

(52) U.S. Cl. ............... 297/217.4; 297/391; 297/188.01

(58) Field of Classification Search ............ 297/217.4, 297/217.3, 391, 188.01; 224/275
See application file for complete search history.

(56) References Cited

U.S. PATENT DOCUMENTS

| | | | |
|---|---|---|---|
| 2,404,109 A | 7/1946 | Steele | 155/173 |
| 2,629,023 A * | 2/1953 | La Fitte | 381/151 |
| 3,205,005 A | 9/1965 | Brown | 297/397 |
| 3,863,283 A * | 2/1975 | Mohr | 5/639 |
| 4,247,961 A | 2/1981 | Masch et al. | 5/442 |
| 5,713,633 A * | 2/1998 | Lu | 297/364 |
| 5,775,771 A * | 7/1998 | La Cour et al. | 297/238 |
| 6,394,551 B1 * | 5/2002 | Beukema | 297/391 |
| 6,406,334 B2 * | 6/2002 | Chu | 439/668 |
| 6,523,894 B1 * | 2/2003 | Mellace | 297/217.4 |
| 6,698,832 B2 | 3/2004 | Boudinot | 297/217.4 |
| 6,739,654 B1 * | 5/2004 | Shen et al. | 297/188.04 |
| 2004/0004378 A1 * | 1/2004 | Park et al. | 297/217.3 |
| 2004/0007906 A1 * | 1/2004 | Park et al. | 297/217.3 |
| 2005/0110313 A1 * | 5/2005 | Vitito et al. | 297/217.3 |

FOREIGN PATENT DOCUMENTS

FR 002764849 A1 * 12/1998
WO WO9301951 * 2/1993

* cited by examiner

*Primary Examiner*—Milton Nelson, Jr.
(74) *Attorney, Agent, or Firm*—Kathryn A. Marra

(57) ABSTRACT

Headphone storage concepts provided include (i) a headrest forming a compartment configured for storage of an item within the compartment; (ii) a headrest cooperatively configured for receiving headphones such that the headphones are removably secured to the headrest; (iii) a headrest having earphones pivotably attached thereto; (iv) a seat forming a compartment (in wing bolsters or in an underseat, rearward-opening drawer) for storage of an item; and (v) headphones with rotatable earphones to provide a slimmer profile for storage.

6 Claims, 5 Drawing Sheets

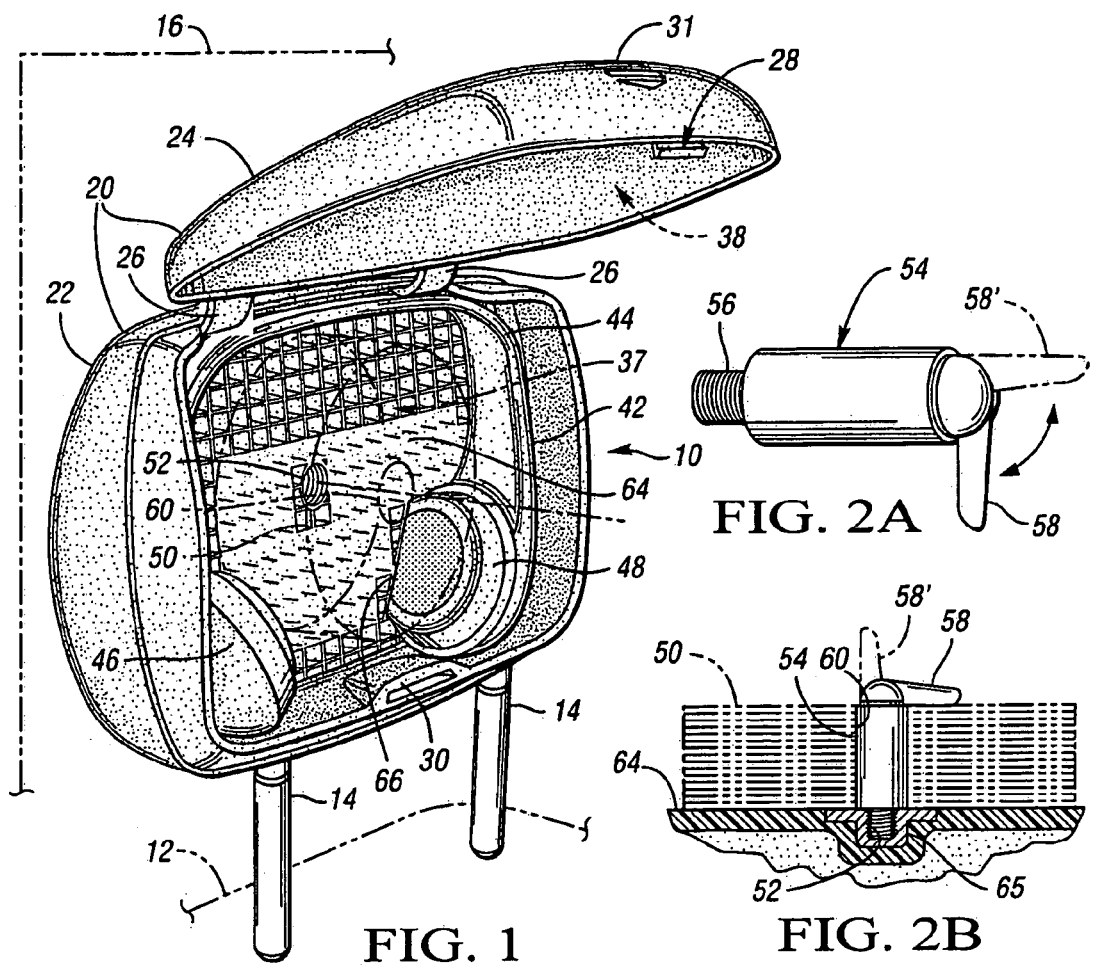
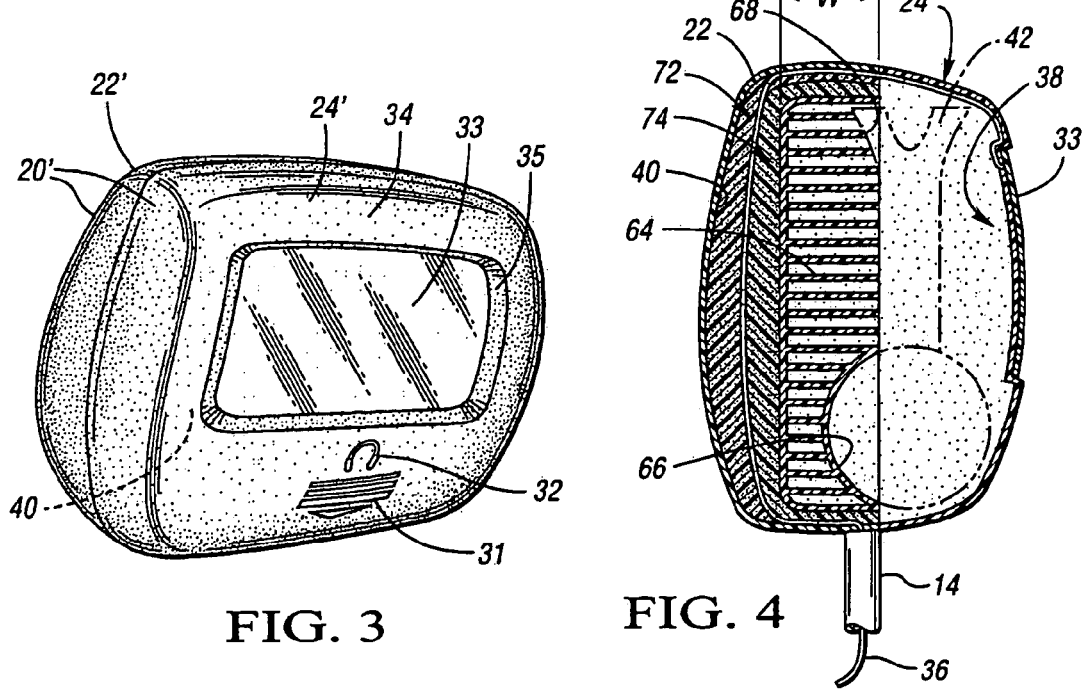

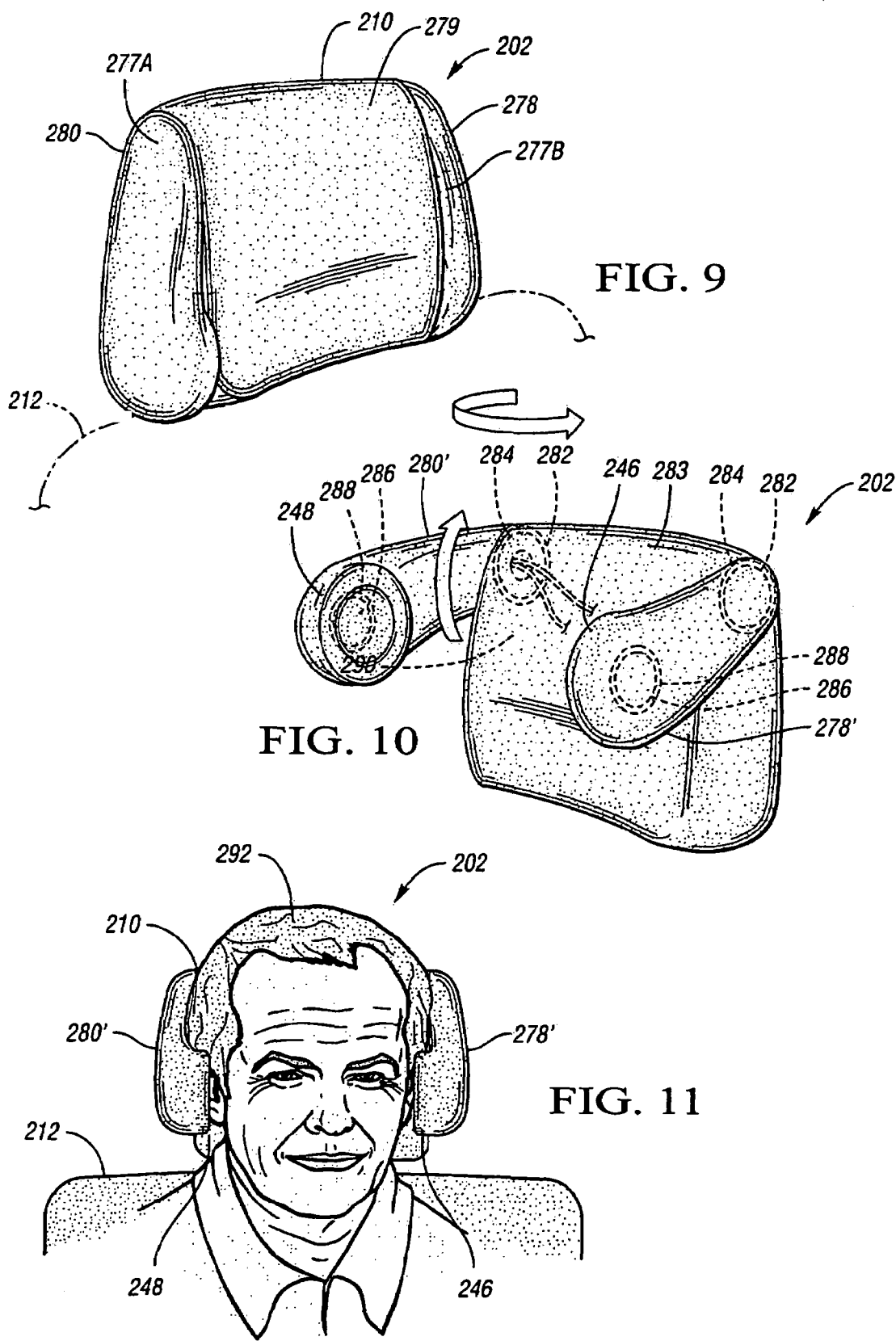

HEADPHONE STRUCTURE AND STORAGE THEREFOR

CROSS-REFERENCE TO RELATED APPLICATIONS

This application claims the benefit of U.S. Provisional Application 60/584,007 filed Jun. 30, 2004.

TECHNICAL FIELD

This invention relates to the storage of items, such as headphones, in a vehicle headrest or seat and to the design of headphones.

BACKGROUND OF THE INVENTION

Modern day vehicles are equipped with a variety of entertainment and other user-interactive systems. These systems and the variety of components that make up these systems may be provided as standard features on the vehicle, may be optional or may be added as an after-market accessory. With the increase of such features onboard, space to install and/or store these systems and their components is at a premium.

SUMMARY OF THE INVENTION

A variety of onboard vehicle storage concepts are provided. Each of the concepts provides a solution to the storage issues associated with the multiplicity of entertainment and other user-interactive systems onboard a vehicle by: (i) utilizing currently unused space for storage of headphones and/or other items; and/or (ii) providing headphones designed to have a compact shape for storage.

A first storage embodiment is a headrest configured for use by a vehicle occupant including structure forming a compartment configured for selective storage of an item within the compartment. The item may be a pair of headphones or any of a variety of items an occupant may wish to store onboard the vehicle. For example, one or more optical media discs may be stacked within the compartment with the headphones peripherally positioned about the disc(s). The structure is openable for selectively placing the item within the compartment or removing the item from the compartment and is closable for substantially enclosing the item within the compartment. The structure is cooperatively configured for fixedly positioning the item within the compartment to prevent substantial movement of the item within the compartment when the structure is closed. For instance, the structure may include a rigid outer casing containing a compliant countermeasure formed with one or more recesses for supporting and stabilizing the item during storage.

In one aspect of the invention, the item may be one or more of headphones, compact discs (CDs), and digital video discs (DVDs). For example, the invention may enable storage of both headphones and a plurality of stacked compact discs or digital video discs.

A second storage embodiment is a headrest assembly for use by a vehicle occupant including a headrest cooperatively configured for receiving headphones such that the headphones are selectively securable to an outer surface of the headrest for storage to prevent substantial movement of the headphones. The headphones are also selectively removable from the outer surface of the headrest for use. For instance, the headrest may be formed with recesses matable with the headphones to thereby selectively secure the headphones to the headrest when the headphones and the recess are mated. The recesses may be configured to at least partially contain a headband portion and earphone portions of the headphones, thereby securing the headphones about the headrest. A cover may be provided for selectively covering and uncovering the headrest and the headphones removably secured to the headrest.

A third storage embodiment is a headrest assembly which includes a headrest, and at least one earphone attached to the headrest. The earphone is configured for concurrent use with the headrest. The arm may pivot between a use position extending forward of the front of the headrest and a nonuse position extending along the side of the headrest so that the outer surfaces of the arm and the headrest are substantially contiguous.

A fourth storage embodiment includes a seating having a seat back and a seat bottom. Structure forming a compartment configured for selective storage of an item within the compartment may be either the seat back or the seat bottom. The structure is openable for selectively placing the item within the compartment or removing the item from the compartment and is closable for substantially enclosing the item within the compartment. For example, the item may be headphones and the structure forming the compartment may be a seat bolster in the seat back. Alternatively, the structure forming the compartment may be the seat bottom. For instance, the seat bottom may be configured to receive a drawer extending rearward, the drawer being openable for selectively placing an item in or removing an item from the drawer and closable for substantially enclosing the item within the drawer.

A fifth storage embodiment is headphones including a headband and at least one earphone rotatably connected to the headband. The earphone is rotatable between a use position, in which the earphone is sufficiently positioned for listening use by a person wearing the headband, and a stored position. The headphones may have a first width or dimension when the earphone is in the use position and a second lesser width or dimension when the earphone is in the stored position. Accordingly, the earphones are designed such that they may compact to require a minimal amount of storage space on the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective illustration of a headrest in an open position forming a compartment for storing headphones;

FIG. 2A is a schematic perspective illustration of a fastener connectable to the headrest of FIG. 1 for securing CDs and DVDs within the compartment, the fastener shown in a release position (in phantom) and in a securing position;

FIG. 2B is a schematic cross-sectional illustration of the fastener of FIG. 2A;

FIG. 3 is a schematic perspective illustration of the headrest of FIG. 1 in a closed position;

FIG. 4 is a schematic cross-sectional illustration of the headrest of FIG. 1 in a closed position and at a headphone storage position;

FIG. 9 is a schematic perspective illustration of another headrest assembly including a headrest and earphones in a non-use position;

FIG. 10 is a schematic perspective illustration of the headrest assembly of FIG. 9 with the earphones rotated to a use position;

FIG. 11 is a schematic plan view illustration of the headrest assembly of FIG. 10 in use by an occupant;

DESCRIPTION OF THE PREFERRED EMBODIMENTS

Figure 5:
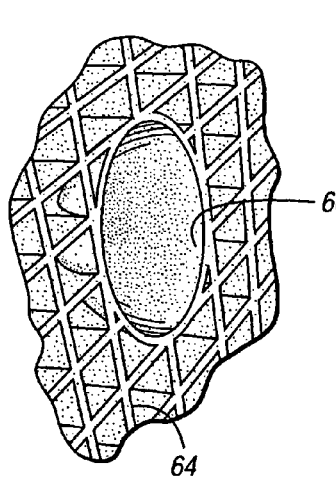
FIG. 5 is a schematic perspective illustration in fragmentary view of a countermeasure contained within the headrest of FIG. 4.

Referring to the drawings, wherein like reference numbers refer to like components, FIG. 1 shows a headrest 10. The headrest 10 is movably mounted to a seat 12 (shown in phantom) via posts 14 extending between the seat and the headrest. The posts 14 may alternatively extend upward and be joined within the headrest to form one integral post component (see FIG. 17 and discussion thereof below for such an embodiment). The seat 12 is mounted in a vehicle 16 (represented in fragmentary phantom view). The headrest 10 includes a casing 20 having a fixed portion 22 and a movable portion 24. The casing 20 is preferably formed from a semi-rigid material, such as a flexible plastic, and may have a covering of leather or cloth. The movable portion 24 is connected to the fixed portion by hinges 26. The movable portion 24 is movable with respect to the fixed portion via the hinges 26 between the raised position of FIG. 1 and a lowered position 24' of FIG. 3 such that the casing 20 may have an open position shown in FIG. 1 and a closed position 20' shown in FIG. 3. Preferably, the hinges 26 have a spring return biasing the movable portion 24 toward the raised position via a viscous dampening mechanism or a dampening gear (not shown). The use of such hinges and viscous dampers will be readily understood by those skilled in the art.

A latch striker 28 is connected to or integrally molded with the movable portion 24. A latch mechanism 30 is mounted to or integrally formed by the fixed portion of the casing 22. The latch mechanism 30 is configured to receive the latch striker 28 in a secure manner such that the movable portion of the casing 24' is held in the lowered position. Pressure applied at pressure locator markings 31 causes the latch striker 28 to be released from the latch mechanism 30, allowing the spring return function of the hinges 26 to raise the movable portion of the casing 24 to the raised position of FIG. 1. Alternatively, other types of latches, locking mechanisms, or fasteners (such as hook and loop type fasteners (e.g.,VELCRO®)) may be employed within the scope of the invention to retain the casing 20' in the closed position.

Referring to FIG. 3, an International Organization for Standardization (ISO) headphone logo 32 appears on the casing 20' as an indication to passengers that headphones may be stored in the headrest 10. The headphone logo 32 may be formed in the casing 20', or may be an applique sticker or a marking on the casing 20'.

Optionally, a display screen 33 may be integrated into the headrest 10 by fixing the screen 33 to the moveable portion 24' of the casing 20. The display screen 33 may be a liquid crystal display (LCD) of the thin film transistor (TFT) or the organic light emitting diode (OLED) type, or any other type of video display screen. The display screen 33 may be substantially flush with an outer surface 34 of the moveable portion 24', or may be set within a recess 35 formed in the moveable portion 24' designed to help reduce the potential for glare reflecting off of the screen 33. Referring to FIG. 4, electrical wires 36 may route from a power source, such as a vehicle battery, through the seat 12, the posts 14 and the hinges 26 to the display screen 33.

Referring again to FIG. 1, the fixed and movable portions of the clam-shell casing 22, 24, respectively, are generally concave, forming first and second interior spaces 37, 38, respectively. When the casing 20' is in the closed position (see FIG. 3), the first and second interior spaces 37, 38, cooperate to form a closed compartment 40 which is defined by the fixed and movable portions 22', 24', of the casing 20'. Referring again to FIG. 1, headphones 42 are placed such that they are partially contained within the first interior space 37 and are supported within the fixed portion 22 of the casing 20. As shown with respect to FIG. 4 and as discussed below, the headphones 42 are completely contained within the compartment 40 when the casing 20' is in the closed position. The headphones 42 include a headband 44 and opposing left and right earphones 46, 48, respectively, connected to the headband 44. Preferably, the headphones are designed to be compatible for use with a compact disc (CD), digital video disk (DVD), or satellite TV or radio system (not shown) included in the vehicle 16. The headphones may be the infrared type and thus have the advantage of being cordless. Other types of headphones, headsets or headgear (e.g., goggles, and helmet-mounted audio and/or visual displays for augmented reality systems and the like) may be used within the scope of the invention. Headphones with or without headbands (e.g., including those that clip or otherwise fit to the ear) are also included within the scope of the invention.

The headphones 42 are positioned generally about the periphery of the first interior space 37, such that the center of the first interior space 37 is empty. This allows a "see-through" headrest (i.e., a headrest that forms an empty space or opening extending completely through the center from front to back) to be used for headphone storage within the scope of the invention. In this embodiment however, the empty space toward the center is utilized to store a stack of optical media discs 50 (e.g., CD's and/or DVD's) (shown in phantom). Structure located within the fixed portion of the casing 22 (i.e., a countermeasure 64, discussed in more detail below with respect to FIG. 4) is formed with a centrally located threaded hole 52. Referring to FIG. 2A, a pin-type fastening element 54 includes a threaded end 56 matable with the threaded hole 52. A pivotable securing element 58, shown in a securing position, is movable to a release position 58' (shown in phantom). When the threaded end 56 is mated with the threaded hole 52, the fastening element 54 (with the securing element 58' in the release position) is placed within a center annulus 60 of the stack of discs 50. Referring to FIG. 2B, the securing element 58 is placed in the securing position to secure the stack of discs 50 within the fixed portion of the casing 22. The stack of discs 50 and the fastening element 54 are sized such that both are contained within the compartment 40 formed by the closed casing 20' (see FIG. 3). The securing element 58 is formed from a flexible material designed to readily break away or flex when subjected to undue forces in the event of a vehicle impact, thus complying with all industry best practices and Federal Motor Vehicle Safety Standards (FMVSS standards). Other means of securing the stack of discs 50 to the fixed portion of the casing 22 include hook and loop (e.g., VELCRO®) straps running through the center annulus 60 and around the stack 50, or a net or pocket secured to the casing 20 and sized to contain the stack 50.

Accordingly, the compartment 40 is sized to contain headphones 42 peripherally located about a centrally located stack of discs 50. A remote (not shown) usable in conjunction with the headphones 42 may also be stored within the compartment 40. In fact, the compartment 40 may be used to hold a variety of items within the scope of the invention. If the seat 12 is a front seat, the movable portion of the casing 24 may open toward the rear of the vehicle 16, allowing access to the stored components (i.e., the headphones and stack 50 of CDs/DVDs) by a rear seat passenger. A rear seat passenger seated directly behind the seat 12 has easily reachable access to the headphones 42; little or no shift in position is required to close or open the casing 20.

Referring to FIG. 4, the headphones 42 are shown in phantom stored within the compartment 40. An energy-absorbing, deformable countermeasure 64 is adjacent to the headphones 42 within the compartment 40. As will be readily understood by those skilled in the art, the countermeasure 64 is designed to meet FMVSS for headrest compliance. Preferably, the countermeasure is formed from expanded polypropylene beads. Alternatively, Polycarbonate ABS, pure polycarbonate, or any other countermeasure approved for use in meeting FMVSS standards may be employed. The choice of material for the countermeasure 64 affects the overall required width (front to rear) of the headrest; a stronger material permits a thinner countermeasure (indicated with width W), which may afford a narrower headrest Referring to FIG. 2B, a threaded insert 65 may be mounted in the countermeasure 64. The threaded end 56 of the securing element 58 mates with the insert 65. The insert 65 may be formed from ultrasonic brass or any other appropriate material.

Referring again to FIG. 1, for representational purposes, the posts 14 are shown ending at a bottom surface of the casing 20. Preferably, the posts 14 extend within the first interior space 36 and form a unitary component that may be generally U-shaped, or may have an irregular shape designed to avoid other structure within the first interior space. (See FIG. 17, discussed below, for an embodiment of a headrest having a unitary post extending within the headrest.) In that case, the countermeasure 64 may be vacuum formed about the post, as is readily understood by those skilled in the art. Other methods of forming the countermeasure, such as pressure molding, may also be employed within the scope of the invention.

Referring to FIG. 4, the countermeasure 64 is formed with earphone recesses (one recess 66 shown in the cross-sectional view of FIG. 4) sized and positioned to receive the earphones 46, 48, as well as a headband recess 68, configured to receive the forward edge of the headband 44 when the headphones are placed within the first interior space 37. Thus, the countermeasure 64 is formed to receive and support the headphones 42. The earphone recesses 66 and the headband recess 68 allow the headphones 42 to partially nest in the countermeasure, affording cushioning protection for the headphones 42. Additionally, the recesses 66, 68, stabilize the headphones 42 within the first interior space 37, preventing substantial movement of the headphones 42 within the compartment 40 when the casing 20' is in the closed position shown in FIGS. 3 and 4. The recesses 66, 68 also serve as a locating indicator to a user storing the headphones 42 within the casing 20, ensuring optimal positioning of the headphones 42 for secure storage. Furthermore, the recesses 66,68 maintain the position of the headphones 42 within the compartment 40 when the casing 20 is in the open position shown in FIG. 1.

Two optional layers of foam, including a lower density first foam 72 and a higher density second foam 74 are positioned between the countermeasure 64 and the fixed portion of the casing 22, see FIG. 4. The first and second foams 72, 74 provide comfort cushioning for an occupant of the seat 12.

Referring to FIG. 5, earphone recess 66 forms a concave cavity in the countermeasure 64 for receiving one of the earphones 46, 48. The countermeasure 64 is shown having a reticulated or honeycomb structure to provide increased stiffness. Alternatively, the countermeasure may be formed to take on a variety of other shapes and textures.

Figure 6:
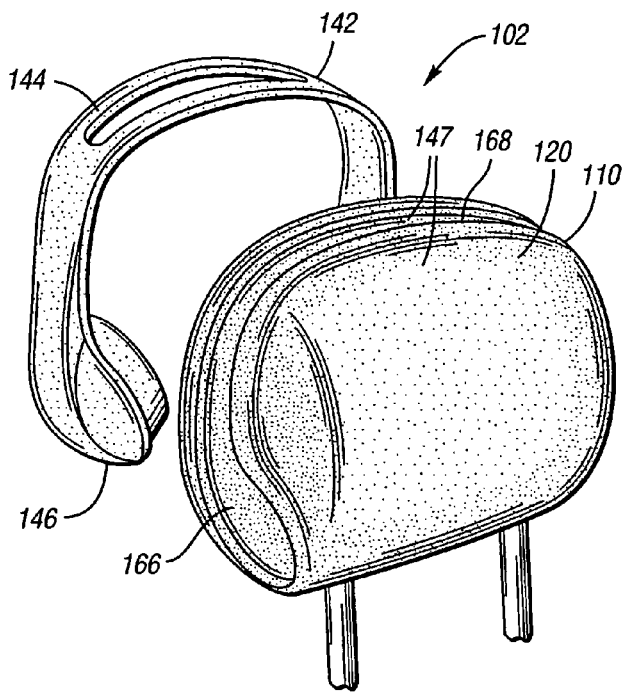
FIG. 6 is a schematic perspective illustration in partial exploded view of a headrest assembly including headphones (shown in partial view) and a headrest formed with recesses configured for receiving the headphones.

Referring to FIG. 6, a headrest assembly 102 includes a headrest 110 and headphones 142. The headrest 110 is formed with a continuous recess formed by two earphone-receiving portions 166 (one shown, the other being disposed in a mirror image opposite that shown) and a headband-receiving portion 168. The recesses 166 and 168 may be integrally formed in the outer casing 120 of the headrest 110. Alternatively, structure within the casing 120 (such as a countermeasure) may be formed with the recesses, and the casing 120 may be manipulated to lie over the recesses, thus taking on the shape of the recesses. Headphones 142 have a headband 144 (double band style), left earphone 146 and right earphone (not shown) configured to at least partially secure the headphones 142 to an outer surface 147 of the casing 120 at the recesses 166, 168. The earphones may flex outward with respect to the headband 144 in response to outward-directed pressure, allowing a user to slip the headphones 142 over the casing 120, positioning the earphones within the earphone-receiving portions 166 and the headband 144 within the headband-receiving portion 168. The headphones 142 are sized such that they are secured to the headrest 110 at the recesses in this position to substantially prevent relative movement of the headphones 142 and the headrest 110, but may be removed by applying an outward spreading force at the earphones and lifting the headphones off of the headrest 110. The headphones 142 may be molded plastic having the same color as the headrest 110 to provide a coordinated appearance.

Figure 7:
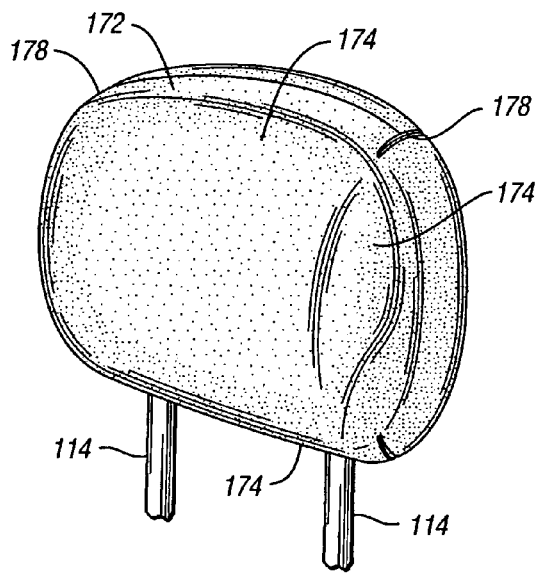
FIG. 7 is a schematic perspective illustration of the headrest assembly of FIG. 6 with a cover concealing the headrest and headphones.
Figure 8:
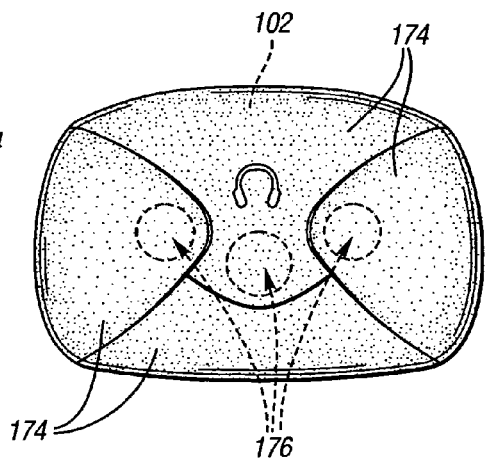
FIG. 8 is a schematic rear view illustration of the covered headrest of FIG. 7.

Referring to FIG. 7, an optional flexible, removable, enveloping cover 172 is positioned over the assembled headphones 142 and headrest 110 of FIG. 6 to "hide" the headphones 142 and present a uniform outward appearance. Referring to FIG. 8, flap portions 174 of the cover 172 are maneuvered around the headrest assembly 102 such that VELCRO® fasteners 176 sewn or adhered to the cover 172 are fastenable, thus holding the cover 172 in place. Slots 178 (some shown in FIG. 7) are cut as necessary between flap portions 174 and around the posts 114 to permit coverage of the headrest assembly 102 by the cover 172.

Referring to FIG. 9, a headrest assembly 202 includes a headrest 210 attached to a seat 212. The headrest 210 has left and right arms, 278, 280 pivotably attached thereto. The arms 278, 280 are shown in a stored position in FIG. 9, in which they are flush and appear integrated with the headrest 210 (i.e., outer surfaces 277A and 277B of the respective arms 278 and 280 are contiguous with an outer surface 279 of the headrest 210). In FIG. 10, the arms have been rotated to a use position 278', 280' (in which the arms 278', 280' extend forward of a front 283 of the headrest 210) via omni-adjustable arm balls 282 that are friction held for universal movement within complementary sockets 284 formed in the headrest 210. Left and right earphones 246, 248, respectively, are similarly attached to the arms 278', 280' via earphone balls 286 held within earphone ball sockets 288 formed in the arms 278', 280', permitting universal pivoting movement of the earphones 246, 248 with respect to the arms 278', 280'. The arm balls 282 and earphone balls 286 allow the earphones to be adjusted universally to fit a wide range of different sized users. Electrical wiring 290 is routed through the arm balls 282 to the earphones 246, 248 (shown only with respect to earphone 248). The wiring 290 may be routed through posts (not shown but similar to posts 14 of FIG. 1 or posts of 614 of FIG. 17) disposed in the headrest 210 and connecting the headrest 210 to the seat 212. In FIG. 11, an occupant 292 of the seat 212 uses the headrest 210 and the earphones 246, 248 concurrently.

Figure 12:
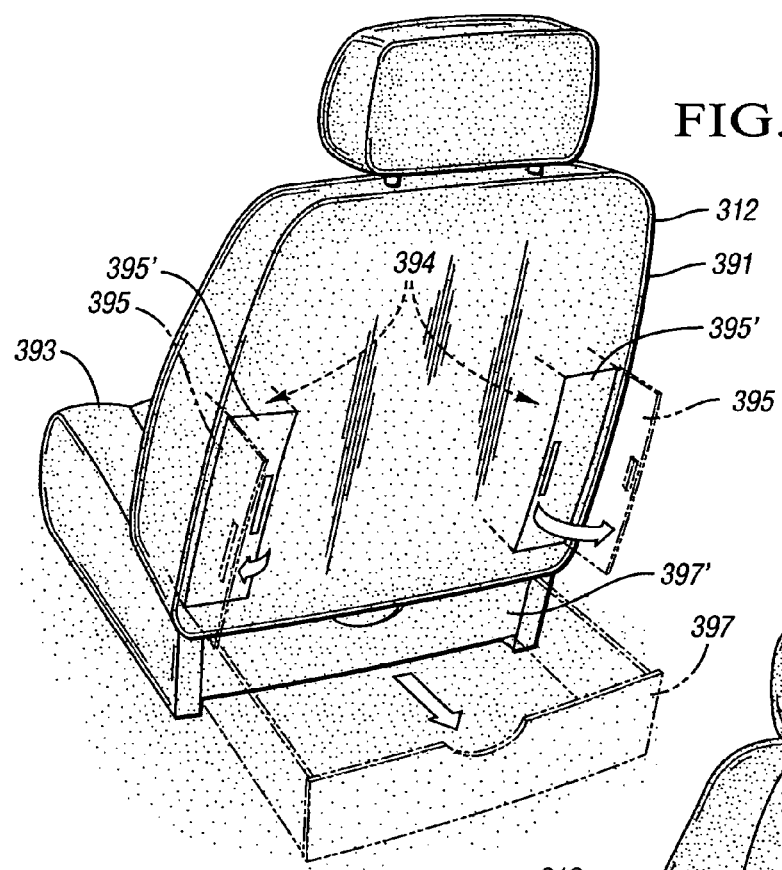
FIG. 12 is a schematic perspective illustration of a vehicle seat having compartments formed in bolsters and having an underseat drawer.
Figure 13:
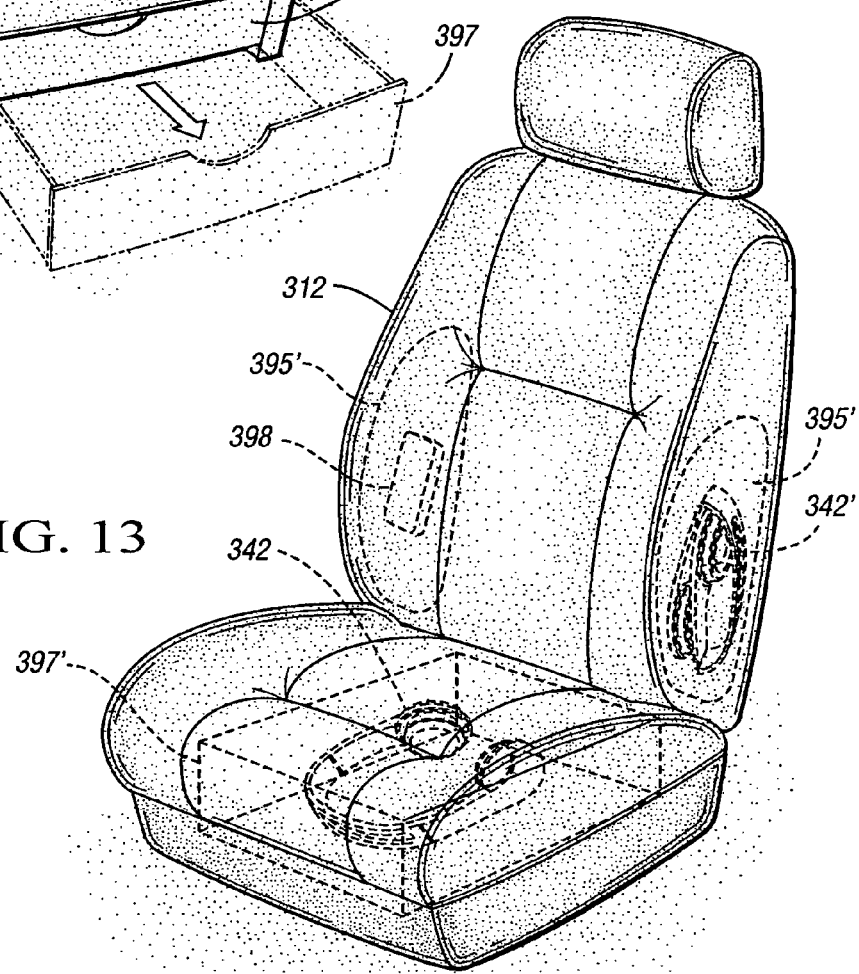
FIG. 13 is a schematic perspective illustration in rotated view of the seat of FIG. 12 showing items stored in the bolsters and in the drawer.

Referring to FIG. 12, a vehicle seat 312 includes a seat back 391 and a seat bottom 393. Wing or bolster compartments 394 are formed in the seat back 391 and are openable and closeable via doors 395 (395 indicating the open position of the door and 395' indicating the closed position, corresponding with an open and a closed status of the wing bolster compartments 394). The doors 395 may be integral with or connected to the compartments 394 or may be hinged flaps attached to the material forming the outer surface of the seat back 391. The doors 395 may be secured in the closed position by hook and loop type fasteners (e.g. VELCRO®), a zipper, or a variety of other fastening mechanisms that accommodate easy, repeated opening of the doors 395 by rear seat occupants. Finally, an under seat drawer 397 is connected to the seat 312 and moves between a stored position (in which the drawer is referenced as 397') and an open position (in which the drawer is referenced as 397). FIG. 13 illustrates the storage of headphones 342 within the drawer 397'. Preferably, the drawer 397' opens rearward for easy access by an occupant of a rear passenger seat. A remote control 398 (operable for remotely controlling a DVD player that includes, for instance, display screen 33 of FIG. 3) and another set of headphones 342' are stored within the wing or bolster compartments 394. Notably, the wing or bolster compartments 394 as well as the space occupied by the under seat drawer 397 represent otherwise unused space on the vehicle; i.e., the invention creates storage compartments from previously vacant or unutilized space.

Figure 14:
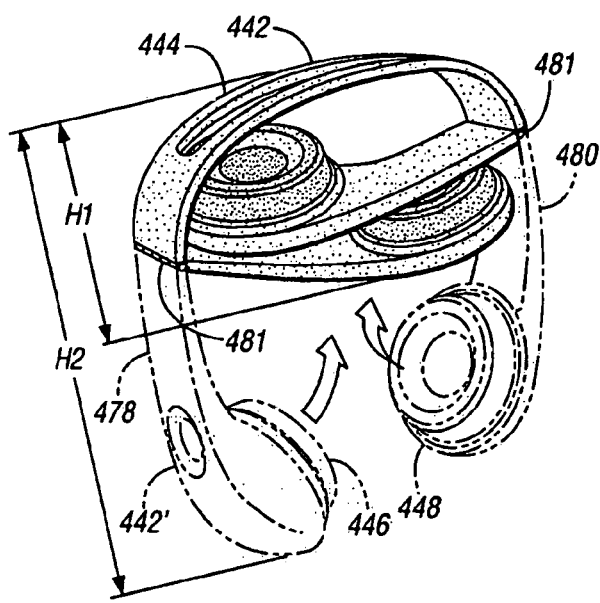
FIG. 14 is a schematic perspective illustration of headphones shown in a collapsed stored position and in an extended use position (in phantom)

Referring to FIG. 14, headphones 442 include a headband 444 connected to left and right arms 478, 480, via hinges 481. Left and right earphones 446, 448 are mounted on the left and right arms 478, 480, respectively. The arms 478, 480 fold (i.e., collapse) inward via the hinges 481 so that the headphones transform from a use position (an extended position) 442' to a non-use position 442 (a collapsed position) having a compact shape for storage and vice versa. In fact the height H1 of the headphones 442 in the collapsed position is only about 50% of the height H2 of the headphones in the extended position 442'. Conceivably, two or more headphones 442 in the non-use position may be stored in the compartment 40 of FIGS. 1, 2 and 4, in the wing or bolster compartments 394 of FIG. 13 or in the drawer 397' of FIG. 12.

Figure 15:
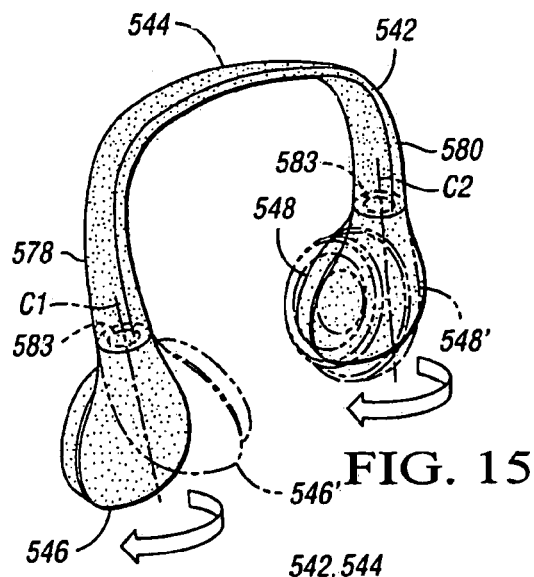
FIG. 15 is a schematic perspective illustration of headphones having rotatable earphones shown in a use position (in phantom) and a stored position.
Figure 16:
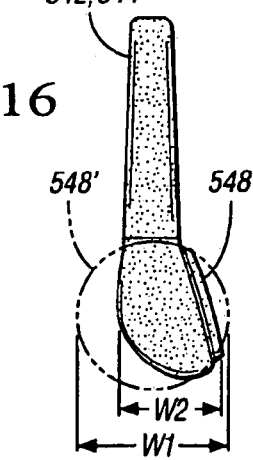
FIG. 16 is a schematic side view illustration of the headphones of FIG. 15 with the earphones in the stored position and in the use position (shown in phantom)

Referring to FIGS. 15–16, headphones 542 include a headband 544 having left and right arms 578, 580, respectively connected thereto. The headband is a "single" type as opposed to the "twin" or "double" style of FIG. 14 (i.e., having two substantially parallel spaced bands) in order to minimize storage space requirements. Left and right earphones 546, 548 are rotatably connected to the left and right arms 578, 580, respectively, at pivot joints 583 (that are a pivot with a detent) that permit rotation of each earphone 546, 548 about respective axes C1 and C2 from non-use positions 546, 548 to use positions 546', 548' (i.e., listening positions), respectively. The axes C1 and C2 are substantially parallel to or coextensive with the length of said arms 578, 580, respectively.

Referring to FIG. 16, the width W2 of the headphones 542 when the earphones are in the stored position (as shown by right earphone 548) is less than the width W1 of the headphones 542 when the earphones are in the use position (as shown by headphone 548'); preferably, the width W2 is about 40% less that the width W1. Thus, the rotatability of the earphones 546, 548 with respect to the arm portions 578, 580 provides a smaller profile for storage. This is especially useful for storing the headphones 542 in a map pocket of a vehicle located in a door. Additionally, if ball sockets are used in the place of the pivot joints 583, significant space savings may be achieved, depending on earphone geometry (i.e., thickness versus diameter of the earphone or earcups), as the earphones 546, 548 may then also be collapsed partially inward toward the headband (similar to the arms 478, 480 of FIG. 14).

Figure 17:
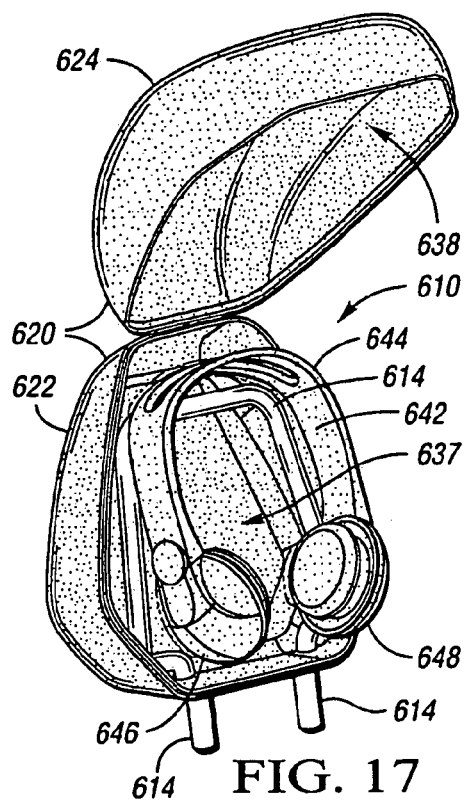
FIG. 17 is a schematic perspective illustration of a headrest in an open position showing a post within a compartment formed by the headrest and headphones being positioned therein.
Figure 18:
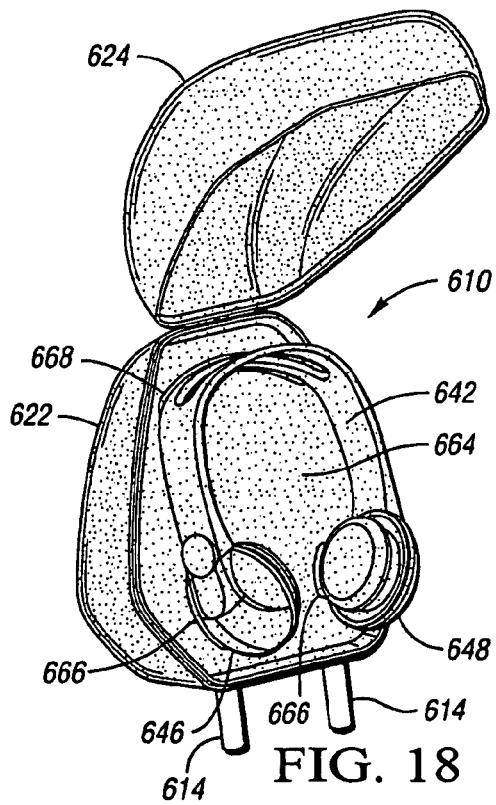
FIG. 18 is a schematic perspective illustration of the headrest of FIG. 17 (with post not shown).

Referring to FIG. 17, a headrest 610 includes a casing 620 formed from a fixed portion 622 and a movable portion 624 (shown in an open position) to create an interior compartment defined by the first and second interior spaces 637 and 638 that contains a countermeasure 664 and headphones 642 (as well as a countermeasure 664) secured in the compartment by recesses 668 in the countermeasure 664 (see FIG. 18) (similar to the recesses 66, 68, described with respect to FIG. 4). Foam may be located between the countermeasure 664 and the fixed portion 622 of the casing 620 like the foam 72, 74 of FIG. 4. The headrest 610 has a generally "gumdrop" shape. The invention, however, may be employed in headrests having a variety of shapes. A post 614 extends upward from a seat (not shown) to form a base structure for supporting the countermeasure 664 (shown in FIG. 18). Notably, the posts 614 bow outward to enable placement of the earphones 646, 648 and formation of recesses in the countermeasure 664 at the location shown (see FIG. 17). Within the scope of the invention, posts may be formed to a variety of shapes as necessary for compatibility with headrest shape and headphone design. For instance, posts 614 may bow inward and/or rearward rather than outward to wind around the preferred stored position of the earphones 646, 648. The posts 614 may be wire-formed steel rod. It is also possible that the posts 614 are magnesium (or another suitable metal) that is die-cast or thixotropic-molded to allow for a variety of sectional shapes, thus increasing the variety of final post shapes achievable. The headphones 642 include a double band-type headband 644 and left and right earphones 646, 648, respectively. In FIG. 18, the countermeasure 664 is formed around the posts 614 and includes a headband recess 668 and earphone recesses 666 for locating and stabilizing the headband 644 and the earphones 646, 648, respectively.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. A headrest configured for use by a vehicle occupant, said headrest comprising:
   structure forming a compartment configured for repeated selective storage of an item within said compartment; wherein said structure is configured to be repeatedly openable for selectively receiving the item within said compartment or selectively removing the item from said compartment and configured to be repeatedly closable for substantially enclosing the item within said compartment;
   wherein said structure is cooperatively configured to receive and support the item to be received in a position within said compartment to prevent substantial movement of the item to be received within said compartment when said structure is closed and to maintain the position of the item to be received when said structure is opened prior to selective removal of the item to be received; and
   wherein said structure includes a substantially rigid outer casing and a compliant countermeasure contained within said casing, said countermeasure being formed with a recess configured to receive a portion of the item to be received such that the item to be received is at least partially supportable by said countermeasure at said recess to thereby prevent substantial movement of the item to be received when said structure is closed and maintaining the position of the item to be received when said structure is opened.

2. The headrest of claim 1, including the item, wherein the item is headphones having an earphone; and wherein said recess is configured to receive and support a portion of said earphone.

3. The headrest of claim 2, wherein said recess is a first recess; wherein said headphones further have a headband connected to said earphone; and wherein said countermeasure is formed with a second recess configured to receive and support a portion of said headband.

4. The headrest of claim 1, further comprising:
   a video display screen mounted to said casing.

5. The headrest of claim 1, including the item, and wherein the item is headphones.

6. The headrest of claim 5, further including an optical media disc; wherein said structure forming a compartment is further configured for repeated selective storage of said optical media disc within said compartment; wherein said structure is configured to be repeatedly openable for selectively receiving said optical media disc within said compartment or selectively removing said optical media disc from said compartment and configured to be repeatedly closable for substantially enclosing said optical media disc within said compartment;
   wherein said structure is cooperatively configured to receive and support said optical media disc in a position within said compartment to prevent substantial movement of said optical media disc when said structure is closed and to maintain the position of said optical media disc when said structure is opened prior to selective removal of the optical media disc; and
   wherein said countermeasure is further formed with an additional recess configured to receive a portion of said optical media disc such that said optical media disc is at least partially supportable by said countermeasure at said additional recess to thereby prevent substantial movement of said optical media disc when said structure is closed and maintaining said position of said optical media disc when said structure is opened, said position of said optical media disc being substantially central to said position of said headphones, said headphones thereby being peripherally positioned about said optical media disc.

* * * * *